Aug. 30, 1949.　　　　　R. AMSLER　　　　　2,480,433
CONDITION RESPONSIVE SYSTEM
Filed Nov. 26, 1945　　　　　　　　　　　　2 Sheets-Sheet 1

Inventor
Robert Amsler.
Morgan, Finnegan and Durham
ATTORNEYS

Aug. 30, 1949.   R. AMSLER   2,480,433
CONDITION RESPONSIVE SYSTEM
Filed Nov. 26, 1945   2 Sheets-Sheet 2

Inventor
Robert Amsler
ATTORNEYS

Patented Aug. 30, 1949

2,480,433

UNITED STATES PATENT OFFICE 2,480,433

CONDITION RESPONSIVE SYSTEM

Robert Amsler, Zug, Switzerland, assignor to Landis & Gyr A. G., Zug, Switzerland, a body corporate of Switzerland Application November 26, 1945, Serial No. 630,912
In Switzerland November 25, 1944

7 Claims. (Cl. 175—320)

(Granted under the provisions of sec. 14, act of
March 2, 1927; 357 O. G. 5)

The present invention relates to condition responsive devices in systems for regulating, controlling or measuring quantities and in which is utilized the property of solid, liquid or gaseous substances to alter their volume with a variation in temperature.

Devices are known, in which expansion responsive means act to vary the position of an armature of a choke coil to control the self-induction of the coil and hence cause a current flowing therethrough to vary in magnitude as a function of the temperature and thereby control a receiver station. According to a preferred embodiment of the invention, a condition responsive reactor (or choke) and a compensating reactor are used. For eliminating external interferences and increasing response, the two reactors are designed as duplex reactors. To this end each reactor has a coil energized from the usual power line and also has a winding going to an indicating or contact instrument. A detrimental effect of this duplex reactor arrangement is that resistance variations in the indicating circuit affect the zero setting of the indicating or contact instrument. In addition, the indicating instrument must be more carefully balanced. Finally, undesired magnetic disturbances react on the condition responsive member.

The present invention obviates these drawbacks essentially by the fact that in this system a choke coil has an armature upon which an expansion system continuously acts, with the coil connected together to at least one other impedance to provide null action at the receiver, i. e. the indicating or contact instrument.

Some preferred examples of embodiment of the arrangement according to the invention are illustrated in the accompanying drawing, in which—

Figure 1:
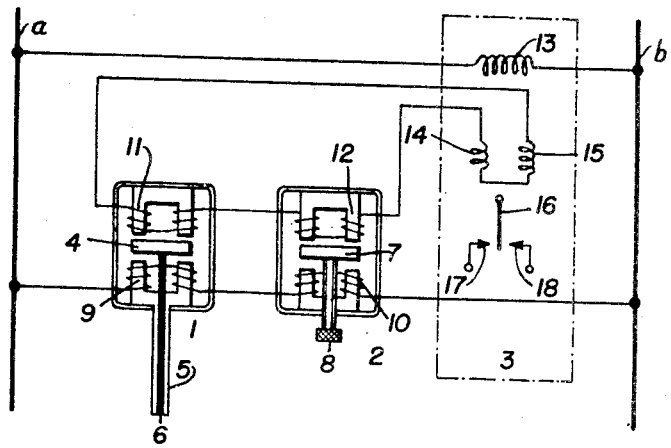
Figure 1 shows an arrangement with secondary choke coils connected in series and in opposition to each other.

Referring to Figure 1, $a$ and $b$ represent the two lines of an A. C. system. Across this system are connected two duplex reactors or chokes 1 and 2 together with a receiver or contact instrument 3. Duplex reactor 1 is designed for condition response. To this end its armature 4 is controlled by a temperature responsive means, which, for instance, may consist of a tubular member 5 and an inner rod 6 of different metals. The duplex reactor 2 serves as a compensating choke whose armature 7 can be set as desired by a screw 8. Reactors 1 and 2 have primary windings 9 and 10 respectively and secondary windings 11 and 12 respectively.

In the example under review the contact instrument 3 consists, say, of a Ferraris instrument having a voltage winding 13 and two current or control windings 14 and 15. On a system disc not shown a middle contact 16 is movable to and fro between two outer contacts 17 and 18. This construction is fully disclosed and claimed in Patent No. 2,442,819, issued June 8, 1948, to Otto Maag. The two primary windings 9 and 10 of two reactors 1 and 2 are in series across the line. The two secondary windings 11 and 12 are connected to buck each other and in series with the two control coils 14 and 15 of the contact instrument.

The contact instrument 3 and reactors 1 and 2 are thus arranged for a null connection. This means that at some predetermined balance there is no current flowing in the current or control windings 14 and 15.

The operation of the aforedescribed arrangement is as follows:

If the two armatures 4 and 7 of the two reactors 1 and 2 lie exactly in the same position relative to their magnet yokes, the A. C. potentials induced in the secondary windings 11 and 12 cancel; consequently the two coils 14 and 15 of the contact instrument are dead and the middle contact remains between the two outer contacts 17 and 18. If then, due to a temperature variation, the armature 4 changes its position relative to its magnet yoke, there arises in the secondary windings a net difference in A. C. potential which increases as the variation in temperature increases. The current then traversing the windings 14 and 15 affects the Ferraris relay system to move middle contact 16 in one or other direction. This movement is maintained till middle contact 16 engages one of the outer contacts 17 and 18. By this switching action further regulating or control of the condition being measured may be obtained. By setting the compensating reactor 2 by means of the set screw 8, an adjustment of the temperature to be maintained can be accomplished.

Figure 2:
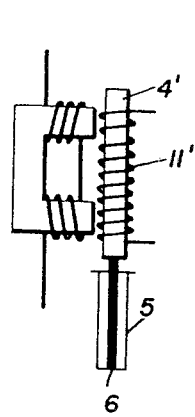
Figures 2 and 3 show special disposition of choke coils.

In Figure 2 a special design of the reactor is shown which has the advantage that the magnetic reaction upon the setting system can, in balanced condition, approximately be eliminated. In the reactor design as per Figure 2, the armature 4' is longitudinally movable with reference to fixed secondary winding 11'. Instead of the fixed coil 11' and the movable armature 4' it is, of course, also possible, to employ the armature in a fixed position and to make the winding movable under the influence of the temperature responsive system. In such manner the magnetic pull can entirely be eliminated.

Figure 3:
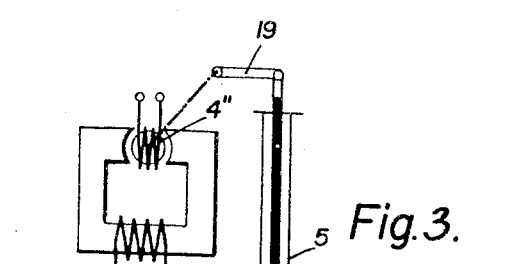

Figure 3 shows a further example of embodiment of a reactor, in which the magnetic reaction likewise disappears entirely in the balanced condition, as the coils become ineffective if no longer carrying current. In this embodiment the armature 4'' is rotatably disposed, and the shifting movement of temperature responsive members 5, 6 may—as indicated—be suitably transferred through a lever 19 or otherwise to armature 4''.

Figure 4:
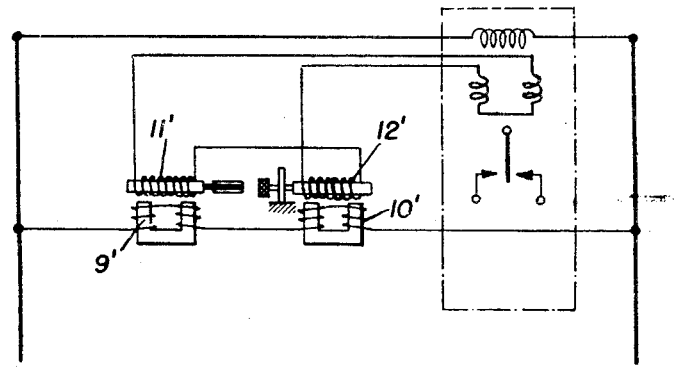
Figure 4 shows a circuit diagram for a choke according to Figure 2.

In Figure 4 the circuit diagram is shown for a reactor according to the aforedescribed embodiment shown in Figure 2. Plainly, for such a reactor the connection for secondary windings as in Figure 1 only can be used, since, in balanced condition, the reactor windings 11' and 12' should be electrically dead. In this example, too, the reactor furnished with the windings 9 and 11 is designed as condition responsive choke, while the reactor furnished with the windings 10 and 12 serves as compensating choke.

The reactor as per Figure 3 may be used in systems shown in circuits of Figures 1 and 4, i. e. their windings 9 and 11 take the places of the points marked by the same reference numbers in Figure 4.

Figure 5:
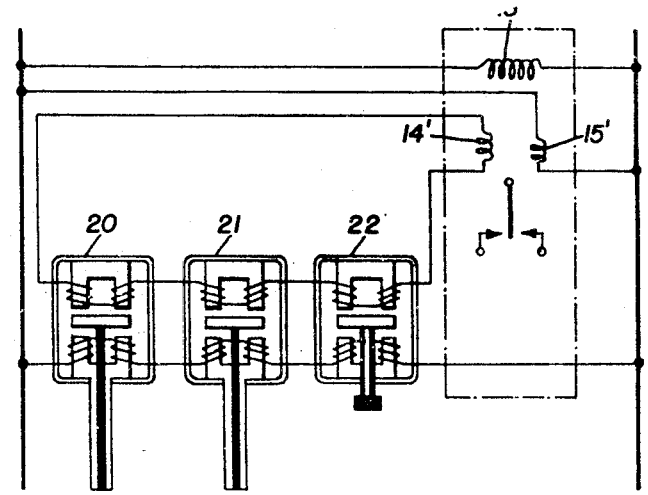
Figure 5 shows a system with multiple chokes.

Instead of two reactors a larger number of reactors may of course be employed as shown, for instance in Figure 5 in a system resembling Figure 1. In such case condition responsive reactors may additively respond to different physical quantities, say, choke 20 to temperature, choke 21 to humidity, pressure, and so on, while choke 22 again is designed as a compensating reactor. The variation of the resultant value then depends on the combined action of the various physical quantities.

It will be noted that, in Figure 5, potential winding 13 is connected across the power line as before. However, one of the current windings, such as 15', is converted to a potential winding and connected across the power line. The remaining winding, 14', is connected in series with the secondary windings of chokes 20, 21 and 22. It is, of course, evident that the secondary windings of chokes 20 and 21 may either aid or oppose each other. Thus, two of the three secondary windings will aid and the third will oppose. At predetermined positions of the armatures of chokes 20, 21 and 22, the field in winding 14' will balance the field in winding 15' so that there will be no response in the relay system. However, with movement of the armature in either choke 20 or 21 or both, the balanced condition between windings 14' and 15' will be destroyed with the sense and magnitude of unbalance being a function of the changes in chokes 20 and 21.

It will be noted that the parallel arrangement of two of the Ferraris relay windings across the power line is the same as in the system of Figure 5. The third winding of the relay is connected across the junctions of the respective choke windings and impedances 24 and 25.

Beside the advantage set forth in the introduction, the connections and arrangements according to the invention reveal the further merit that in case of amplification of the control current one amplifier only would be required. In the well-known connections of the prior art two well balanced amplifiers are necessary, since a non-uniform degree of amplification produces a variation in the resultant value of the regulator. However, in the connection according to the invention, a wavering degree of amplification generally causes but a trifling variation of the sensitivity of the regulator.

I claim:

1. A system adapted to be energized from an alternating current power line and adapted to respond to at least one physical variable such as temperature or pressure for the purpose of controlling such variable, said system comprising a condition responsive reactor having primary and secondary windings, a ferromagnetic core including a movable armature for said reactor, means responsive to said physical variable for moving said armature in accordance with the sense and magnitude of change of said variable, a compensating reactor having primary and secondary windings, a ferromagnetic core including a movable armature for said compensating reactor, manual means for adjusting said compensating armature to provide a predetermined compensating reactor impedance, means for connecting the two primaries in series across a power line, a relay, a potential winding for said relay connected across said power line, two current windings for said relay, said relay being adapted to respond in one of two ways depending upon the relative phase of currents in said potential and current windings of said relay, means for connecting the secondary windings of said reactors to said current windings, said secondary windings being poled to have equal and opposite alternating potentials therein when the compensating reactor and condition responsive reactor are balanced, said secondary windings being adapted to have a resultant alternating potential upon unbalance of said condition responsive reactor to a change in the armature position thereof.

2. The system of claim 1 wherein the condition responsive reactor has an elongated armature which is movable lengthwise by the condition responsive means and wherein the reactor magnetic circuit and coils are so arranged that substantially no unbalanced magnetic forces lengthwise of the armature are impressed thereon.

3. A system adapted to be energized from an alternating current power line and adapted to respond to at least one physical variable such as temperature or pressure for the purpose of controlling such variable, said system comprising a first condition responsive reactor having primary and secondary windings and a ferromagnetic circuit including a movable armature, a second condition responsive reactor having primary and secondary windings and a ferromagnetic circuit including a movable armature, means for moving the armature of said first reactor in accordance with the sense and magnitude of a change of one variable, means responsive to another physical variable for moving the armature of said second reactor in accordance with the sense and magnitude of change of said other variable, a third reactor having primary and secondary windings and a ferromagnetic circuit including a movable armature, manual means for adjusting the armature of said third reactor, means connecting all primary windings of said reactor in series across a power line, means for connecting the secondary windings in series, a Ferraris type relay having two potential and one current winding, means for connecting the two potential windings across said power line, and means for connecting the current winding and said secondary windings in series with each other, said secondary windings being so polarized that at predetermined condition of balance the fields in said relay are equal and opposite with said relay responding to unbalance in said system due to movements in one or both of the armatures of the condition responsive reactors.

4. A system adapted to be energized from an alternating current power line and adapted to respond to at least one physical variable such as temperature or pressure for the purpose of controlling such variable, said system comprising at least one reactor having two separate U-shaped ferromagnetic yokes with the arms of the yokes aligned, a primary winding on one yoke, a secondary winding on the other yoke, an armature between the opposed aligned yoke arms, said yokes being separated to define an air gap within which said armature may be moved, means responsive to said physical variable for moving said armature in said air gap in accordance with the sense and magnitude of change of said variable, means for connecting the primary winding in said power line circuit, a relay having one winding connected in said power line circuit and having another winding, and means for feeding the other winding of said relay current derived from the currents flowing in said secondary winding.

5. The system of claim 4 wherein said means responsive to said physical variable for moving said armature comprises a bimetal arrangement.

6. A system adapted to be energized from an alternating current power line and adapted to respond to at least one physical variable, such as temperature or pressure for the purpose of controlling such variable, said system comprising reactors each including two windings having ferromagnetic cores and a movable armature to vary selectively the impedance of the reactors, means for connecting one winding of one reactor in series with a winding of another reactor, said series-connected windings being connected across the power line the other windings developing alternating currents opposite to each other, and being connected in series so that one developed current may oppose the other, means responsive to said physical variable for moving one of said armatures from its original setting in accordance with the sense and magnitude of the change of said variable, a relay having two windings, one connected in the power circuit and the other connected to be energized by the opposed windings of the reactors, said relay including an armature moved oppositely in accordance with the relative strength of the opposed currents in said other windings.

7. The system of claim 6 in which one of said first armatures is moved by a thermally controlled expansion system and the third armature is the rotatable member of a Ferraris type relay.

ROBERT AMSLER.

REFERENCES CITED

The following references are of record in the file of this patent:

FOREIGN PATENTS

| Number | Country | Date |
| --- | --- | --- |
| 189,997 | Switzerland | June 16, 1937 |
| 196,291 | Switzerland | May 16, 1932 |
| 485,213 | Germany | Oct. 28, 1929 |